United States Patent [19]

Aiyama et al.

[11] Patent Number: 5,669,101
[45] Date of Patent: Sep. 23, 1997

[54] CONTROL HANDLE FOR CUTTING MACHINE

[75] Inventors: Fumihiko Aiyama; Yoshikazu Iida, both of Tokyo, Japan

[73] Assignee: Kioritz Corporation, Tokyo, Japan

[21] Appl. No.: 524,121

[22] Filed: Aug. 24, 1995

Related U.S. Application Data

[63] Continuation of Ser. No. 166,648, Dec. 13, 1993, abandoned.

[30] Foreign Application Priority Data

Jan. 29, 1993 [JP] Japan ............................ 5-006721

[51] Int. Cl.⁶ .......................... A01D 34/68; G05G 5/00; B25G 3/00
[52] U.S. Cl. ..................... 16/111 A; 16/125; 16/DIG. 25; 16/DIG. 41; 30/276; 56/239
[58] Field of Search ..................... 16/114, 2, 125, 16/DIG. 24, DIG. 25, DIG. 41, 111 A; 403/33, 291, 325; 56/239, DIG. 18; 30/276

[56] References Cited

U.S. PATENT DOCUMENTS

| | | | |
|---|---|---|---|
| 4,282,652 | 8/1981 | Ballas, Sr. | 30/276 |
| 4,288,171 | 9/1981 | Kattke | 403/218 |
| 4,825,548 | 5/1989 | Driggers | 30/276 |

*Primary Examiner*—Daniel W. Howell
*Assistant Examiner*—Kenneth J. Hansen
*Attorney, Agent, or Firm*—Bauer & Schaffer

[57] ABSTRACT

An elongated operating shaft supporting a tool at one end, a drive motor at its other end, and transmission means extending through said shaft to drive said tool is provided with a control handle for adjusting the holding and guiding the position and orientation of said tool. The control handle is formed of a unitary body having a handgrip section and an attachment section, which is provided with a hole into which the supporting shaft is inserted and which is formed with sufficient clearance to permit said handle body to be rocked to and fro along the longitudinal axis of the shaft. Spring means is mounted for biasing said handle body along an axis having an inclined position with respect to the longitudinal axis of the shaft so that said surface of the shaft is contacted by the surface of the hole at at least two opposed points, thereby to normally lock the handle body in said inclined position.

1 Claim, 4 Drawing Sheets

CONTROL HANDLE FOR CUTTING MACHINE

This is a continuation of Ser. No. 08/166,648, filed Dec. 13, 1993 now abandoned.

FIELD OF THE INVENTION

This invention relates to a control handle for portable power tools and, in particular, to a handle for controlling the disposition of the operating shaft of a portable cutting tool such as a rotary grass trimmer.

BACKGROUND OF THE INVENTION

A portable cutting tool such as a rotary grass trimmer having a rotary cutting blade provided on the tip of a long operating rod has been known. This type of machine is used by a worker by swinging the tip of the operating rod up and down and/or right and left when cutting weeds and the like. For this purpose, this type of machine is generally provided with a control handle by which it can be manipulated.

A typical control handle according to the prior art comprises an attachment consisting of an upper member and a lower member fixed together on the lower part of a handle body. These attachment members are secured on the operating rod so as to nip the pipe of the operating rod from the upper and lower sides thereof. Each of these attachment members has bolt inserting holes aligned with those on the other attachment members. Thus, the control handle is fixed on the operating rod by inserting a bolt through each bolt inserting hole and tightening with a nut from one side.

Therefore, in use, cutting must be conducted by appropriately adjusting the orientation of the entire tool according to the ground contour at the work site in order to make the rotary cutting blade contact the weeds or grass at the appropriate angle.

For this purpose, the position of the control handle on the operating rod may be adjusted by detaching and then moving the control handle lengthwise along the operating rod and then refixing it at the new position appropriate for cutting. This adjustment requiring loosening of the nuts must be made every time the orientation of the tool is to be changed. Alternatively, the posture of the worker and the direction of his hands can be changed without changing the original position of the control handle.

Loosening and retightening of the nuts every time orientation of the tool is to be changed are time consuming and significantly lowers working efficiency.

On the other hand, continued work by the operator with the control handle fixed at the position disproportional with the orientation of the tool will give the worker serious fatigue and also results in low working efficiency.

SUMMARY OF THE INVENTION

The present invention has as its object the provision of a control handle capable of having its attaching position readily changeable with one simple touch, enabling changing of the orientation of a cutting machine.

The control handle according to the present invention comprises a handle grip having an attachment part unitarily formed at its lower part. The attachment part has an inserting hole for the operating rod, the hole being formed to have sufficient clearance so the rod is able to be pulled and/or pushed in the extending or longitudinal direction of the operating rod. A protruding bracket formed integrally with the attachment part extends in toward the extending direction of the operating rod and spring means is mounted below the bracket and the rod to bias the handle body to incline backward.

Since the protruding bracket is being pushed toward the operating rod by the spring means, the handle body is also pushed to incline backward in the extending direction of the operating rod. As a result, the upper and lower edges of the inserting hole provided in the attachment part are pushed to the operating rod so that the handle body is fixed on the operating rod at the appropriate position. This is the locked state of the control handle.

In order to change the position of the control handle, the grip body is pushed forward in the extending direction of the operating rod against the force of the spring means, thus unlocking the handle. Then the position of the main handle body can be changed by rocking it forward and backward to the desired position on the operating rod or rotating it around the operating rod. Upon releasing the handle body the control handle returns to the locked state by the spring means and fixed on the operating rod at the new position.

The control handle according to the present invention is capable of being adjusted at any time as needed at the appropriate position according to the orientation of the cutting blade of the cutting machine or the working posture of the operator, and further, such change of the position can be done with one touch. Therefore, it gives a minimum fatigue to the worker with efficient cutting works.

DETAILED DESCRIPTION OF THE INVENTION

Figure 1:
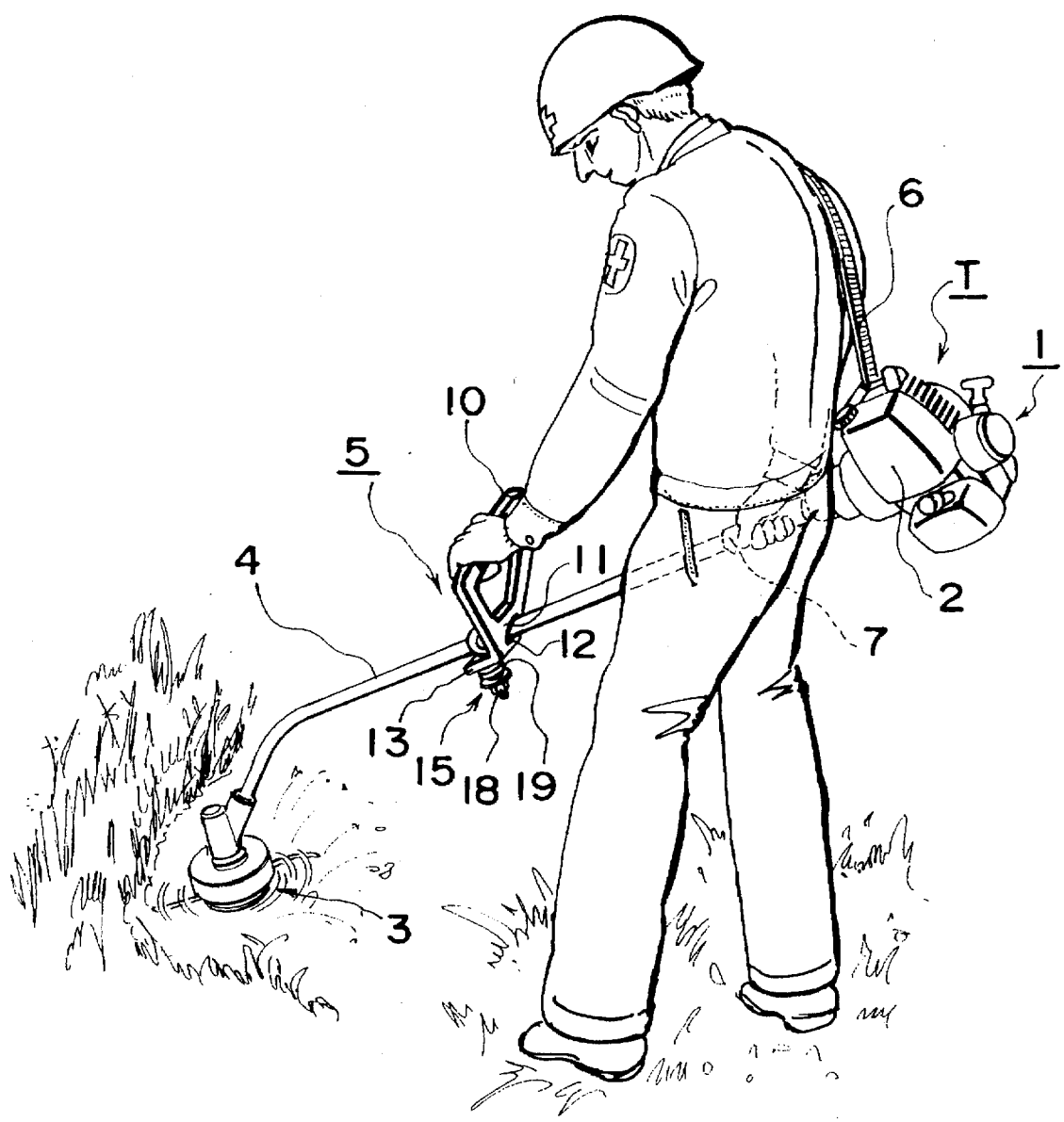
FIG. 1 is a perspective view showing an operator using the cutting tool provided with a control handle according to one embodiment of the present invention.

The power tool T shown in FIG. 1 comprises a portable grass trimmer having an overall body 1 including at one end a motor 2 such as air-cooled two-cycle gasoline engine and at its other end a rotary cutting blade 3. The body 1 constitutes an operating rod 4 formed of a light metal pipe in which is inserted a power transmission shaft (not shown in the drawings) for transmitting the rotary driving force of the motor 2 to the cutting blade 3. Attached to the operating rod 4 according to one embodiment of the present invention is a control handle 5.

The operator normally hangs the machine body 1 on his shoulder by a belt 6 and performs weed cutting or the like by moving the rotating blade of the operating rod 4 up and down or swinging it right and left by holding the control handle 5 in one hand while simultaneously gripping with his other hand a grip 7 formed on the rear end of the operating rod 4.

The control handle 5 as shown in the drawings comprises a main grip body 10 having an inverted triangular ring shape and an attachment part 11 by which it is secured on the operating rod 4. The attachment 11 is formed in the lower part of the triangular ring body 10 as one piece with it.

Figure 2:
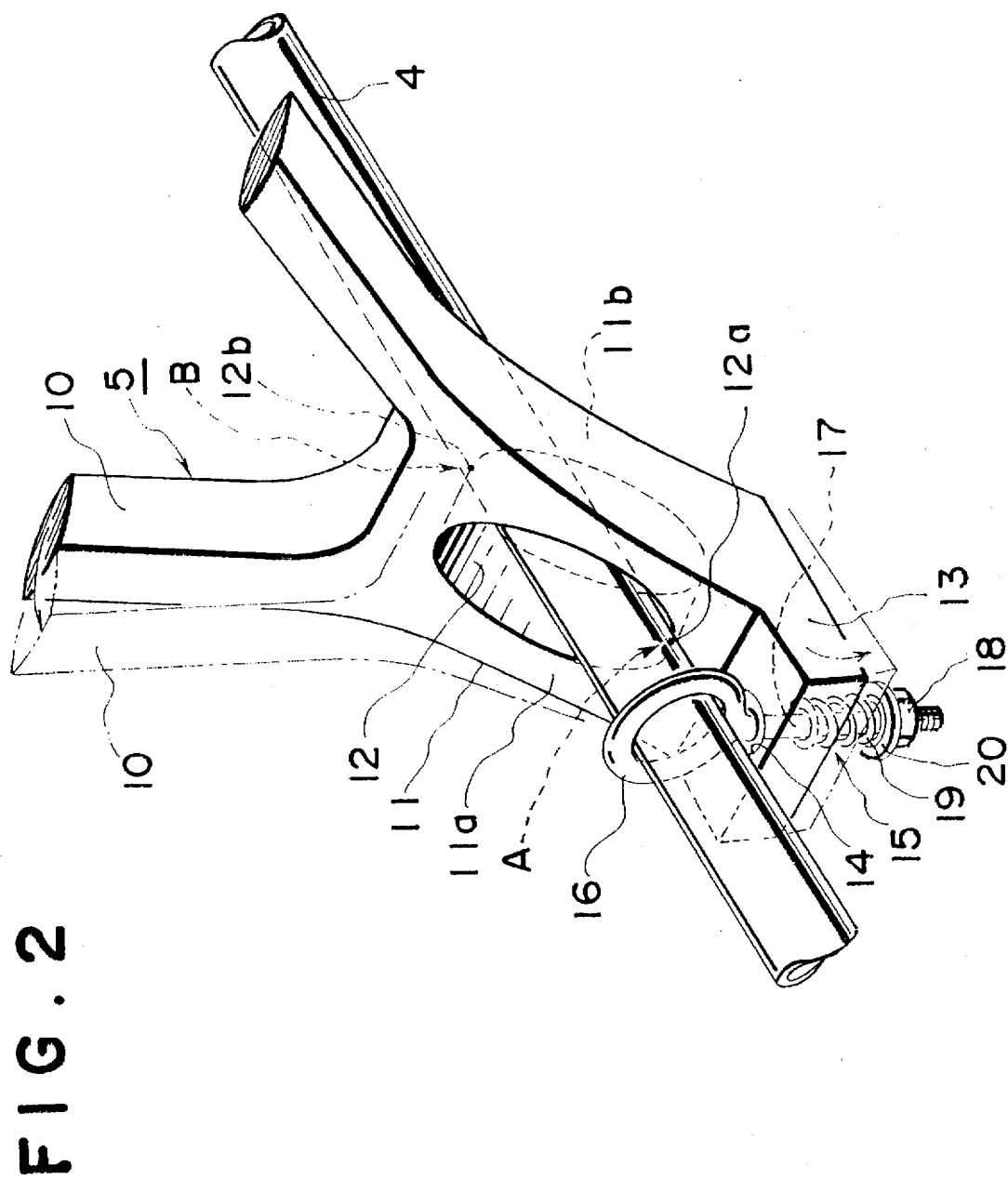
FIG. 2 is a perspective view showing a major part of the control handle attached on the operating rod as shown in FIG. 1.
Figure 3:
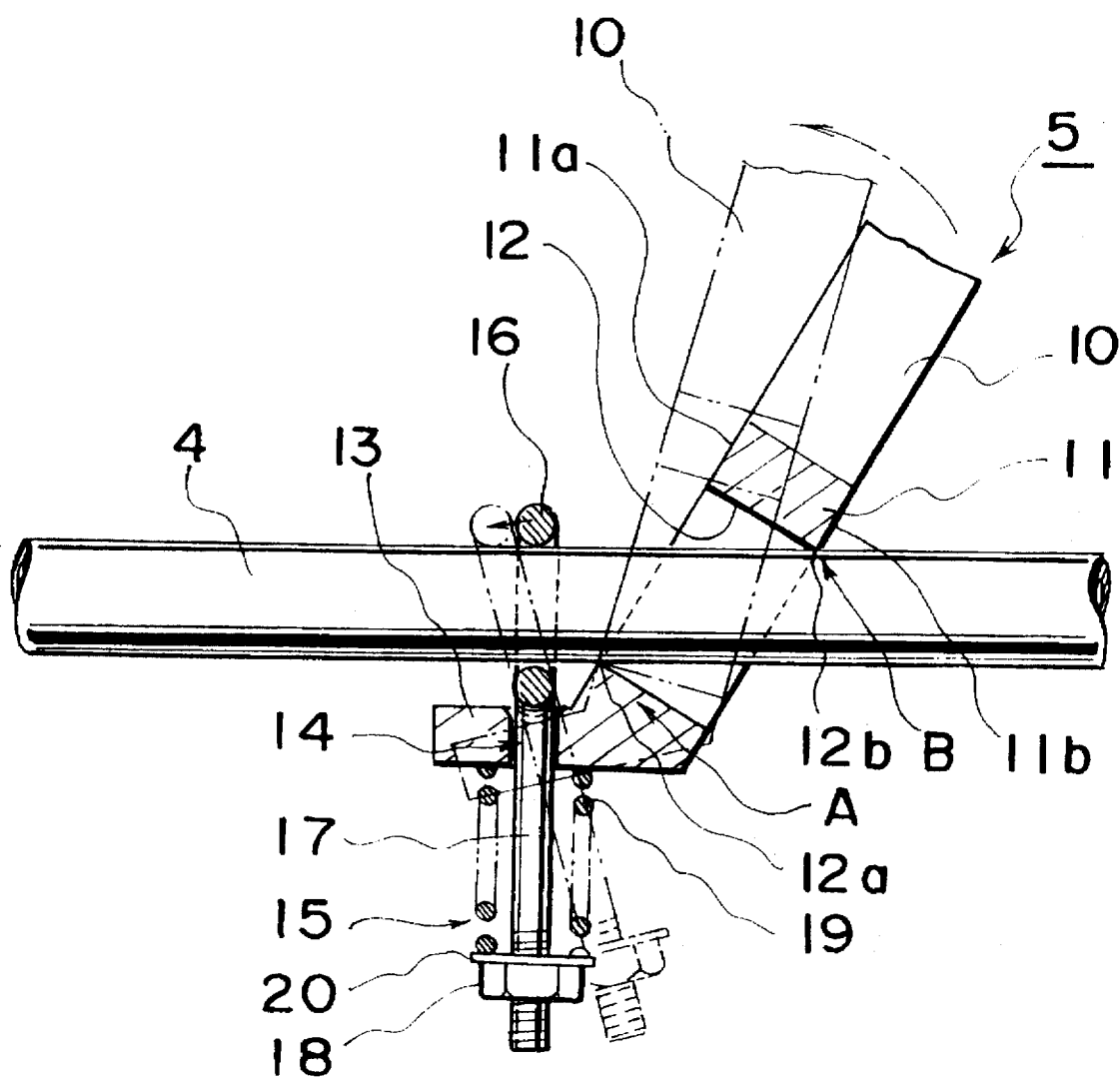
FIG. 3 is a vertical sectional view showing the control handle attached on the operating rod as shown in Fig.

As shown in FIGS. 2 and 3 the attachment 11 has an appropriate thickness and is provided with an inserting hole 12 in its center to receive the operating rod 4. This inserting hole 12 is formed so as to have clearance with the rod 4 so that the triangular ring body 10 can be pushed forward or pulled backward in the extending direction of the operating rod 4. The size of the inserting hole 12 is larger than the outer diameter of the operating rod 4. Preferably, its right to left width is slightly larger than the outer diameter of the operating rod 4 and the shape is longitudinally elliptic in order to prevent the rolling of the triangular ring body 10 to the right and left as much as possible.

The longitudinal width of the inserting hole 12 may be sufficiently long so that both the lower end 12a of the inserting hole 12 at the front face 11a of the attachment part 11 and the upper end 12b of the inserting hole 12 at the back face 11b of the attaching part 11 may contact with the outer surface of the operating rod 4 (hereinafter referred to as having contacting parts A and B, respectively) at the same time so as to restrict the backward inclination of the triangular ring body 10 to maintain it in the status of inclining backward at an appropriate angle.

Protruding forwardly from the lower part of the attachment part 11 is a bracket 13, which is provided with a through hole 14 passing through from the upper surface to the bottom surface thereof, into which is placed a spring supporting member 15.

The spring supporting member 15 comprises an eye-bolt arrangement having a ring 16 surrounding the operating rod so as to be freely movable back and forth and freely rotative around the operating rod 4 and a threaded stem 17 formed extending downward from the ring 16. The stem 17 is inserted into the through hole 14 to extend downwardly from the bottom surface of the bracket 13. A cylindrical compression coil spring 19 is placed over the stem and a spring fixing nut 18 is screwed on the lower end of the stem 17 using a washer 20 having a larger diameter than the outer diameter of the spring 19. Consequently, the spring is compressed between the bracket 13 and the washer 20 and kept at the condition given with the predetermined expansion force.

The spring support member 15, the spring 19, the washer 20, and the spring fixing nut 18 comprise a biasing arrangement by which (as the spring 19 is located in between the washer 20) the bracket 13 is normally pushed toward the operating rod 4. Therefore, the front face 11a of the attachment part 11 is normally forced to contact the operating rod 4 at the contacting part A and the back face 11b of the attaching part 11 is normally forced to incline backward in the extending direction of the operating rod 4 to contact the operating rod 4 at the contacting part B. Consequently, by the expansion force of the spring 19, the main handle body 10 is fixed in the state of inclining backward at the predetermined angle to the operating rod 4. This is the locked state of the control handle 5.

Figure 4:
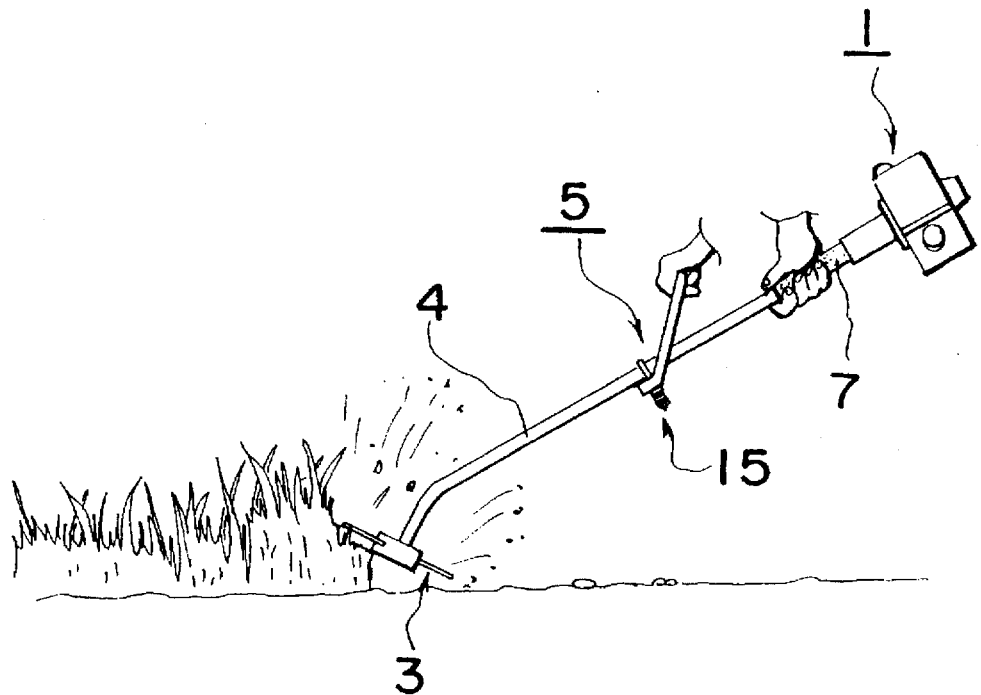
FIGS. 4 and 5 are diagrams showing conditions of use according to one embodiment of the present invention.

While keeping the control handle 5 is this locked state, the worker can operate the cutting machine T by holding the main handle grip body 10 with his hand and pulling the main handle body 10 backward in the extending direction of the operating rod 4 (to the direction for his side) (see FIGS. 1 and 4).

Figure 5:
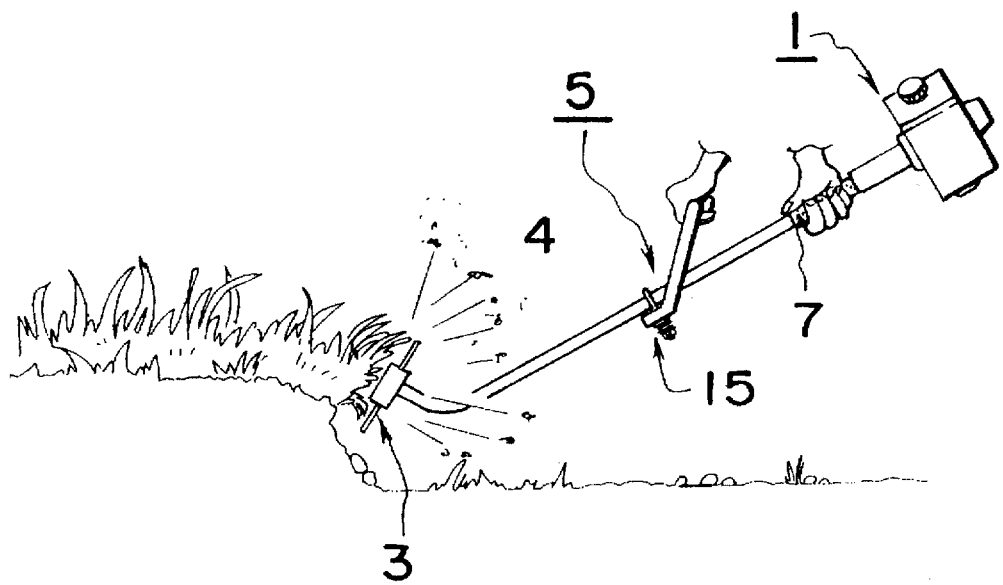

Meanwhile, in case the ground contour of the working site changes and the orientation of the cutting tool T must be changed, the control handle 5 can be moved by one touch to the position suitable for the new orientation of the cutting machine T as seen from FIGS. 4 and 5.

That is, if the worker pushes the triangular ring grip body 10 forward in the extending direction of the operating rod 4 and opposing the expansion force of the spring 19, the protruding bracket 13 is tilted down to the direction away from the operating rod 4 at the said contact point A and the locked state of the control handle 5 is released as mentioned above. Then, the worker can move the control handle 5 back and forth to the desired position on the operating rod 4 or turn it around the operating rod 4.

If the worker releases his hand from the handle body 10 thereafter, the handle body 10 automatically inclines backward by the effect of the spring 19, and then the control handle 5 is returned to the locked state at the new position.

As aforementioned, the control handle according to the embodiment of the present invention can change its fixing position on the operating rod 4 as needed, and this change of the position can be achieved simply by pushing the main handle body 10 forward. Therefore, it is easy to use and gives better operation efficiency.

What is claimed is:

1. In a portable power tool having an elongated operating shaft supporting a tool at one end, a drive motor at its other end, and transmission means extending through said shaft to drive said tool, an adjustably positioned control handle for holding and guiding the position and orientation of said tool during use, said control handle comprising a unitary body having a handgrip section and an attachment section, said attachment section having a hole into which said supporting shaft is freely inserted, said hole being elliptical in section and having a long axis extending in a plane generally parallel to the longitudinal axis of the shaft and which is formed with sufficient clearance to permit said handle body to be rocked to and fro along the length of said shaft, said body being formed with a bracket having a bolt mounted thereon, said bolt having an eye protruding forwardly of said handle means, said support shaft passing through the eye of said bolt, and compression spring means held by a stem of said bolt interposed between said bracket and said supporting shaft continually acting against said shaft for biasing the body of said control handle in an inclined position with respect to the axis of said shaft so that said shaft is contacted by the body of said control handle at two opposed points lying along the long axis of said hole in the body of said control handle, thereby to normally lock said handle body in said inclined position, and when said handle is rocked to alternately engage said shaft to move said handle along said shaft.

* * * * *